United States Patent
Yang et al.

(10) Patent No.: US 10,129,136 B2
(45) Date of Patent: Nov. 13, 2018

(54) VIRTUAL ROUTER CLUSTER, DATA FORWARDING METHOD AND APPARATUS

(71) Applicant: BEIJING BAIDU NETCOM SCIENCE AND TECHNOLOGY CO., LTD., Beijing (CN)

(72) Inventors: Yi Yang, Beijing (CN); Ying Wang, Beijing (CN); Yu Zhang, Beijing (CN); Yuchi Dong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 52 days.

(21) Appl. No.: 15/239,126

(22) Filed: Aug. 17, 2016

(65) Prior Publication Data

US 2017/0149648 A1 May 25, 2017

(30) Foreign Application Priority Data

Nov. 20, 2015 (CN) .......................... 2015 1 0811517

(51) Int. Cl.
*H04L 12/721* (2013.01)
*H04L 12/66* (2006.01)
(Continued)

(52) U.S. Cl.
CPC .............. *H04L 45/12* (2013.01); *H04L 12/66* (2013.01); *H04L 45/46* (2013.01); *H04L 45/586* (2013.01);
(Continued)

(58) Field of Classification Search
CPC ......... H04L 45/12; H04L 12/66; H04L 45/46; H04L 45/586; H04L 45/7453; H04L 47/125; H04L 67/10; H04L 67/1002
(Continued)

(56) References Cited

U.S. PATENT DOCUMENTS

| 2002/0138628 | A1* | 9/2002 | Tingley ............. H04L 29/12009 709/227 |
| 2007/0104198 | A1 | 5/2007 | Kalluri et al. |

(Continued)

FOREIGN PATENT DOCUMENTS

| JP | 2004-254132 A | 9/2004 |
| JP | 2005-39381 A | 2/2005 |

(Continued)

OTHER PUBLICATIONS

Shindo, "Server makes communication equipment, changing NFV industry completely (machine-translated title)," *Nikkei Electronics*, Dec. 22, 2014, pp. 47-54 (with partial English machine translation). (9 pages).

(Continued)

*Primary Examiner* — Obaidul Huq
(74) *Attorney, Agent, or Firm* — Seed IP Law Group LLP

(57) ABSTRACT

The present application discloses a virtual router cluster, and a data forwarding method and apparatus. A specific implementation of the virtual router cluster includes: a gateway and at least one virtual router interconnected with the gateway; the gateway receiving an externally transmitted data packet; the gateway selecting a first virtual router corresponding to the data packet from the at least one virtual router according to an Open Shortest Path First protocol, and forwarding the data packet to the first virtual router corresponding to the data packet; and the first virtual router receiving the data packet and forwarding the data packet to a destination. This implementation implements network load balancing, thereby avoiding network congestion.

15 Claims, 5 Drawing Sheets

(51) Int. Cl.
*H04L 12/715* (2013.01)
*H04L 12/713* (2013.01)
*H04L 12/743* (2013.01)
*H04L 29/08* (2006.01)
*H04L 12/803* (2013.01)

(52) U.S. Cl.
CPC ........ *H04L 45/7453* (2013.01); *H04L 47/125* (2013.01); *H04L 67/10* (2013.01); *H04L 67/1002* (2013.01)

(58) Field of Classification Search
USPC .................................. 370/351, 389, 392
See application file for complete search history.

(56) References Cited

U.S. PATENT DOCUMENTS

| | | | |
|---|---|---|---|
| 2012/0131579 A1* | 5/2012 | Pujolle | H04L 12/4641 718/1 |
| 2016/0191360 A1* | 6/2016 | Onoue | H04L 43/0876 709/224 |
| 2017/0019373 A1* | 1/2017 | Meng | H04L 12/6418 |

FOREIGN PATENT DOCUMENTS

| | | |
|---|---|---|
| JP | 2006-203471 A | 8/2006 |
| JP | 2013-514744 A | 4/2013 |
| KR | 10-0451796 B1 | 10/2004 |

OTHER PUBLICATIONS

Zhu Peidong, "High Performance Router Design and Implementation, 1st Edition", National Industrial Press, Aug. 1, 2013, pp. 20-24.

* cited by examiner

VIRTUAL ROUTER CLUSTER, DATA FORWARDING METHOD AND APPARATUS

CROSS-REFERENCE TO RELATED APPLICATION

This application is related to and claims priority from Chinese Application Ser. No. 201510811517.3, filed on Nov. 20, 2015, entitled "VIRTUAL ROUTER CLUSTER, DATA FORWARDING METHOD AND APPARATUS" by Beijing Baidu Netcom Science And Technology Co., Ltd., the entire disclosure of which is hereby incorporated by reference.

BACKGROUND

Technical Field

The present application relates to the field of computer technology, specifically to the field of Internet technology, and more specifically to a virtual router cluster, and a data forwarding method and apparatus.

Description of the Related Art

With the explosive growth of the Internet, new services related to networks have attracted increasing attention. Cloud computing is one exemplary complex service. In a cloud computing network, user requirements become more diversified, for example, individual configuration of route configuration information, secure access control list (ACL), network address translation (NAT), network isolation, network rate limiting, and high-performance network transmission, which imposes higher requirements on routers and significantly increases the complexity of routers.

To address the new challenges in the cloud computing networks, currently there are two solutions for routers. One is based on software virtualization implementation, i.e., virtual routers. The other is highly customized physical routers (with specialized protocols, specialized hardware, etc.).

Prior art virtual routers generally implement routing by using iptables (network protocol address filtering system) and protocol stacks. In this implementation, repeated copying in a kernel is required during the packet processing, which results in a drawback in performance.

Logically, in a prior art virtual router cluster, one virtual router is generally responsible for merely forwarding multiple virtual router instances. When a virtual router is abnormal and unavailable, all the virtual router instances for which the virtual router is responsible are all in an unavailable state. In terms of extension, such an instance-specific hosting design (that is, there is a binding relationship between virtual router instances and virtual routers) of virtual routers lacks universality, and fails to achieve the independence of virtual routers.

BRIEF SUMMARY

An objective of the present application is to provide an improved virtual router cluster, and a data forwarding method and apparatus, so as to solve at least one of the technical problems mentioned in the Background section.

According to a first aspect, the present application provides a virtual router cluster, including: a gateway and at least one virtual router interconnected with the gateway, the gateway receiving an externally transmitted data packet; the gateway selecting a first virtual router corresponding to the data packet from the at least one virtual router according to an Open Shortest Path First protocol, and forwarding the data packet to the first virtual router corresponding to the data packet; and the first virtual router receiving the data packet and forwarding the data packet to a destination.

In some embodiments, when selecting the first virtual router corresponding to the data packet from the at least one virtual router according to the Open Shortest Path First protocol, the gateway acquires address information of the data packet; and selects the first virtual router corresponding to the data packets based on a hash value of the address information.

In some embodiments, the address information of the data packet includes a source network protocol address, a source port number, a target network protocol address, a target port number and a protocol code of the data packet.

In some embodiments, when the first virtual router receives the data packet and forwards the data packet to the destination, a plurality of first kernels polls a network interface of a first host at a predetermined time interval; and if the network interface receives the data packet sent by the gateway when a second kernel in the plurality of first kernels accesses the network interface, the second kernel acquires the data packet and forwards the data packet to the destination, wherein the first host is a host of the first virtual router, and the first kernel is a kernel of the first host exclusively occupied by the first virtual router.

According to a second aspect, the present application provides a data forwarding method, comprising: receiving an externally transmitted data packet; selecting a first virtual router corresponding to the data packet according to an Open Shortest Path First protocol; and forwarding the data packet to the first virtual router corresponding to the data packet.

In some embodiments, the selecting the first virtual router corresponding to the data packets according to the Open Shortest Path First protocol comprises: acquiring address information of the data packets; and selecting the first virtual router corresponding to the data packets according to a hash value of the address information.

In some embodiments, the address information of the data packet comprises: a source network protocol address, a source port number, a target network protocol address, a target port number and a protocol code of the data packet.

According to a third aspect, the present application provides a data forwarding method, comprising: receiving a data packet sent by a gateway based on satisfying an Open Shortest Path First protocol; and forwarding the data packet to a destination.

In some embodiments, the receiving the data packet sent by the gateway based on satisfying the Open Shortest Path First protocol comprises: receiving the data packet sent by the gateway based on that a hash value of address information of the data packet satisfies the Open Shortest Path First protocol.

In some embodiments, the address information of the data packet may comprise, for example, a source network protocol address, a source port number, a target network protocol address, a target port number and a protocol code of the data packet.

In some embodiments, the receiving the data packet sent by the gateway based on satisfying the Open Shortest Path First protocol comprises: polling a network interface at a predetermined time interval; and acquiring the data packet and forwarding the data packet to the destination, if the network interface receives the data packet sent by the gateway.

According to a fourth aspect, the present application provides a data forwarding apparatus, comprising: a receiving module configured to receive an externally transmitted data packet; a selecting module configured to select a first virtual router corresponding to the data packet according to an Open Shortest Path First protocol; and a forwarding module configured to forward the data packet to the first virtual router corresponding to the data packet.

In some embodiments, the forwarding module is further configured to: acquire address information of the data packet; and select the first virtual router corresponding to the data packet based on a hash value of the address information.

In some embodiments, the address information of the data packet comprises: a source network protocol address, a source port number, a target network protocol address, a target port number and a protocol code of the data packet.

According to a fifth aspect, the present application provides a data forwarding apparatus, comprising: a receiving module configured to receive a data packet sent by a gateway based on satisfying an Open Shortest Path First protocol; and a forwarding module configured to forward the data packet to a destination.

In some embodiments, the receiving module is further configured to: receive the data packet sent by the gateway based on that a hash value of address information of the data packet satisfies the Open Shortest Path First protocol.

In some embodiments, the address information of the data packet may comprise, for example, a source network protocol address, a source port number, a target network protocol address, a target port number and a protocol code of the data packet.

In some embodiments, the receiving module is further configured to: poll a network interface at a predetermined time interval; and acquire the data packet and forward the data packet to the destination, if the network interface receives the data packet sent by the gateway.

The virtual router cluster and the data forwarding method and apparatus provided by the present application determine the virtual router for receiving and forwarding data according to the Open Shortest Path First protocol, so that load balancing can be achieved, thereby avoiding network congestion.

In addition, in some embodiments of the virtual router cluster of the present application, the virtual routers are separately connected to the gateway, and there is no coupling relationship between the virtual routers, so that even if one or more virtual routers in the cluster fail, the normal operation of the other virtual routers will not be affected.

BRIEF DESCRIPTION OF THE DRAWINGS

Other features, purposes and advantages of the present application will become more apparent from a reading of the detailed description of the non-limiting embodiments, said description being given in relation to the accompanying drawings, among which.

DETAILED DESCRIPTION

The following detailed description is provided with reference to the accompanying drawings and embodiments. It should be appreciated that the embodiments described herein are provided to illustrate the present disclosure, but not to limit the present disclosure. In addition, it should be noted that only the related parts of the present disclosure are shown in the accompanying drawings for ease of description.

It should be noted that the embodiments and features of the embodiments in the present application, on a non-conflicting basis, may be combined. The present application will be discussed in details below with reference to the accompanying drawings.

Figure 1:
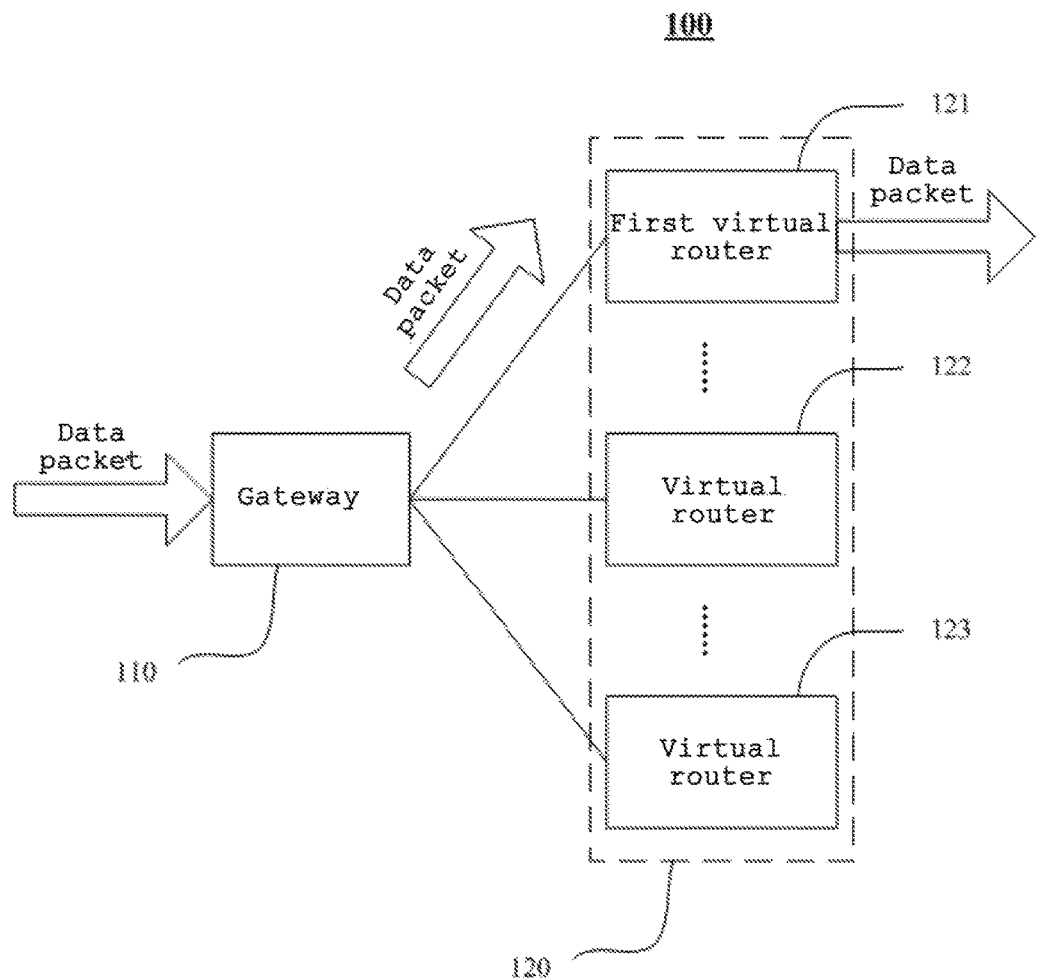
FIG. 1 is a structural diagram of a virtual router cluster according to one embodiment of the present application.

FIG. 1 is a structural diagram 100 of a virtual router cluster according to an embodiment of the present application.

In this embodiment, the virtual router cluster includes a gateway 110 and at least one virtual router 121 to 123 interconnected with the gateway.

Herein, "interconnect" may mean that, for example, the gateway 110 may send data information to the virtual routers 121 to 123. In addition, the interconnection between the gateway 110 and the virtual routers 121 to 123 is not limited to a specific interconnection form. In different application scenarios, the interconnection between the gateway 110 and the virtual routers 121 to 123 may take different interconnection forms, including wired connection or wireless connection. Wireless connection may include, but is not limited to, 3G/4G connection, WiFi connection, Bluetooth connection, WiMAX connection, Zigbee connection, ultra-wideband (UWB) connection, and other known or future developed wireless connection method.

The gateway 110 receives an externally transmitted data packet, selects a first virtual router 121 corresponding to the data packet from the virtual routers according to the Open Shortest Path First protocol, and forwards the data packet to the first virtual router 121 corresponding to the data packet.

The Open Shortest Path First (OSPF) protocol is an interior gateway protocol (IGP) for determining routes in a single autonomous system (AS). The OSPF protocol is an implementation of a link-state routing protocol and belongs to the interior gateway protocols (IGPs), and therefore operates inside the autonomous system.

The first virtual router 121 receives and forwards the data packet to a destination.

In some optional implementations, the virtual routers in the virtual router cluster of this embodiment may be integrated in different physical machines. That is, in these optional implementations, each virtual router in the virtual router cluster corresponds one-to-one to a host. In these optional implementations, the first virtual router 121 may receive, through a network interface (for example, a network interface card) of the host of the first virtual router 121, a data packet sent by the gateway 110. After performing routing processing, the first virtual router 121 forwards the data packet to the destination through the network interface of its host.

As can be seen from FIG. 1, in the virtual router cluster of this embodiment, the virtual routers 121 to 123 respectively exchange data directly with the gateway 110, and the virtual routers 121 to 123 do not exchange data with each other. That is, there is no master-slave relationship between the virtual routers 121 to 123. For a data packet, it passes through only the gateway 110 and the corresponding first virtual router 121 (and does not pass through any virtual router in the virtual router cluster other than the corresponding first virtual router 121), and is forwarded to the outside by the first virtual router 121.

In this way, when one or more virtual routers in the virtual router cluster communicate abnormally, the gateway may select a virtual router from normally working virtual routers in the virtual router cluster based on the Open Shortest Path First protocol, so as to receive the data packet and forward the received data packet to the outside, thereby ensuring that the virtual router cluster as a whole works properly.

In some optional implementations, the gateway 110 may specifically select the first virtual router 121 corresponding to the data packets from the virtual routers 121 to 123 based on the Open Shortest Path First protocol in the following manner:

acquiring address information of the data packet; and selecting the first virtual router 121 corresponding to the data packet based on the hash values of the address information.

In these optional implementations, for example, the address information of the data packet may include: a source network protocol address, a source port number, a target network protocol address, a target port number and a protocol code of the data packet. Hash values corresponding one-to-one to the source network protocol address, the source port number, the target network protocol address, the target port number and the protocol code of the data packet may be computed from the address information of the data packet by using a hash algorithm, and the hash values are used as the only basis for selecting the first virtual router from the virtual router clusters.

In some application scenarios, for example, the hash values of the source network protocol address, the source port number, the target network protocol address, the target port number and the protocol code of the data packet may be computed by using a known hash algorithm, or the hash values of the source network protocol address, the source port number, the target network protocol address, the target port number and the protocol code of the data packet may be obtained by using a specific hash algorithm that is configured according to a specific application scenario.

In some optional implementations, when the first virtual router 121 receives and forwards the data packet to the destination, a plurality of first kernels polls a network interface of a first host at a predetermined time interval; and if the network interface receives the data packet sent by the gateway when any second kernel in the plurality of first kernels accesses the network interface, the second kernel acquires the data packet and forwards the data packet to the destination. The first host is a host of the first virtual router, and the first kernel is a kernel of the first host that is exclusively occupied by the first virtual router.

In these optional implementations, the first virtual router 121 generally may "monopolize" one or more kernels of its host to process the data packet. These kernels (that is the first kernel) may access a network interface (for example, a network interface card) of its host (that is, the first host) at a particular time interval. When one of the kernels (that is, the second kernel) accesses the network interface of the host, if the network interface receives a data packet sent by the gateway, the kernel may acquire the data packet from the network interface and perform processing, such as network address translation (NAT), routing and filtering, on the data packet, and then forward the data packet to the destination.

In addition, in these optional implementations, the first virtual router 121 "monopolize" one or more kernels of its host to process the data packet, thereby avoiding the frequent copying of computer kernel data during the processing of data pockets in an existing physical router.

Figure 2:
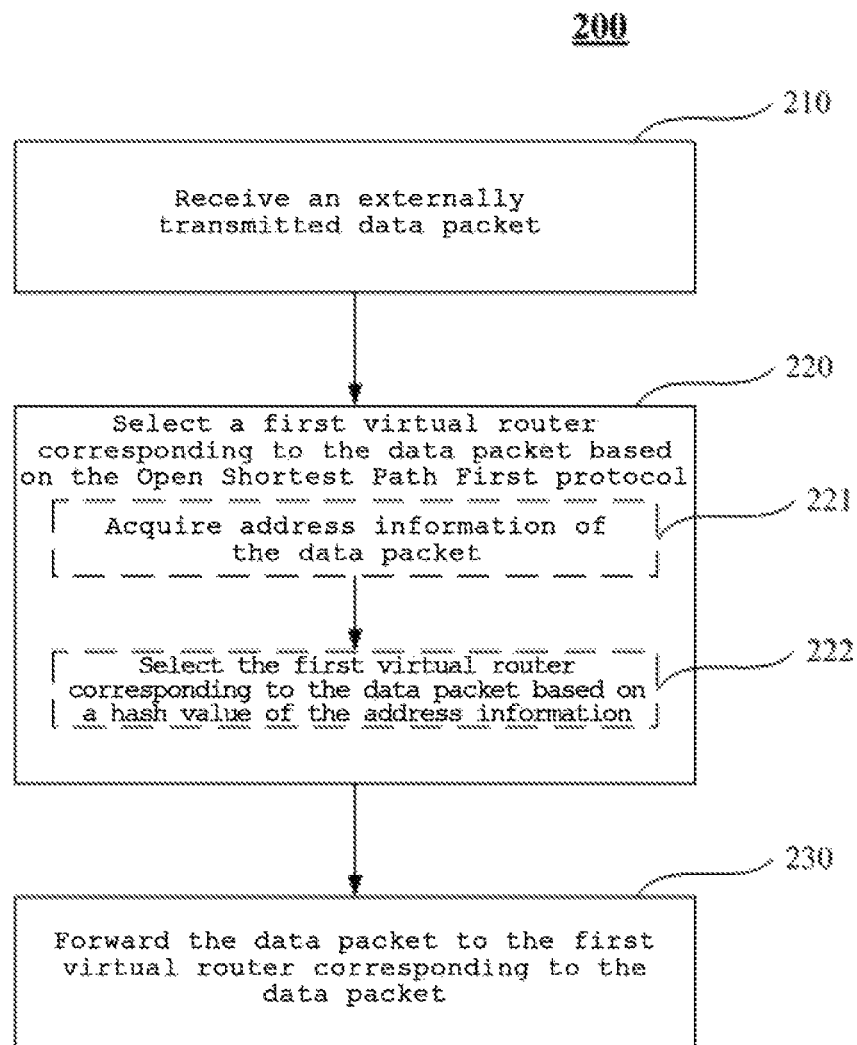
FIG. 2 is a flowchart of a data forwarding method according to one embodiment of the present application.

FIG. 2 is a schematic flowchart 200 of a data forwarding method according to an embodiment of the present application.

The data forwarding method of this embodiment may be implemented, for example, in the gateway 110 in the virtual router cluster as shown in FIG. 1.

Specifically, the data forwarding method of this embodiment includes:

Step 210: Receive an externally transmitted data packet, and

Step 220: Select a first virtual router corresponding to the data packet based on the Open Shortest Path First protocol; and Step 230: Forward the data packet to the first virtual router corresponding to the data packet.

In some optional implementations, step 220 of selecting the first virtual router corresponding to the data packet based on the Open Shortest Path First protocol may be implemented by performing the following steps:

Step 221: Acquire address information of the data packet; and

Step 222: Select the first virtual router corresponding to the data packet based on a hash value of the address information.

In some optional implementations, the address information of the data packet may include, for example, a source network protocol address, a source port number, a target network protocol address, a target port number and a protocol code of the data packet.

Figure 3:
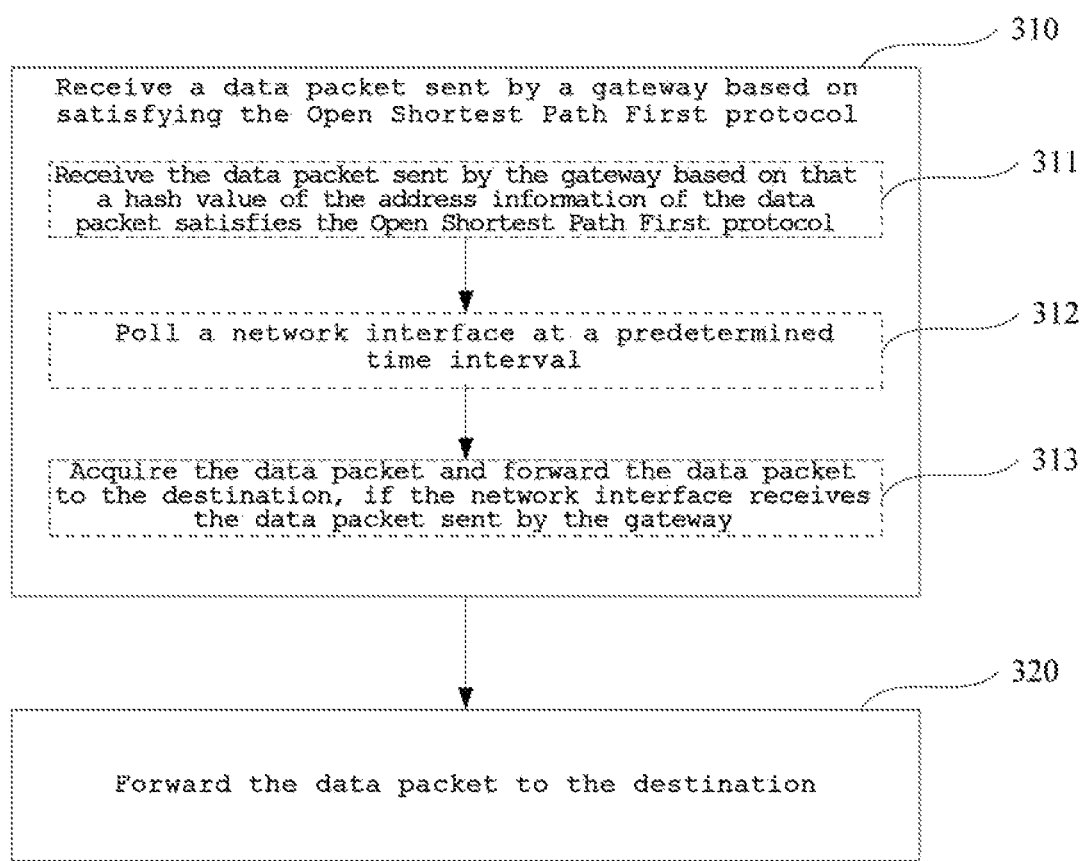
FIG. 3 is a flowchart of a data forwarding method according to another embodiment of the present application.

FIG. 3 is a flowchart 300 of a data forwarding method according to another embodiment of the present application.

The data forwarding method of this embodiment may be implemented, for example, in the first virtual router 121 in the virtual router cluster as shown in FIG. 1.

Specifically, the data forwarding method of this embodiment includes:

Step 310: Receive a data packet sent by a gateway based on satisfying the Open Shortest Path First protocol; and Step 320: Forward the data packet to a destination.

In some optional implementations, step 310 of receiving the data packet sent by the gateway based on satisfying the Open Shortest Path First protocol may be implemented, for example, in the following manner:

Step 311: Receive the data packet sent by the gateway based on that a hash value of the address information of the data packet satisfies the Open Shortest Path First protocol.

In some optional implementations, the address information of the data packet may include, for example, a source network protocol address, a source port number, a target network protocol address, a target port number and a protocol code of the data packet.

In some optional implementations, step 310 of receiving the data packet sent by the gateway based on satisfying the Open Shortest Path First protocol may further include:

Step 312: Poll a network interface at a predetermined time interval; and

Step 313: Acquire the data packet and forward the data packet to the destination, if the network interface receives the data packet sent by the gateway.

Figure 4:
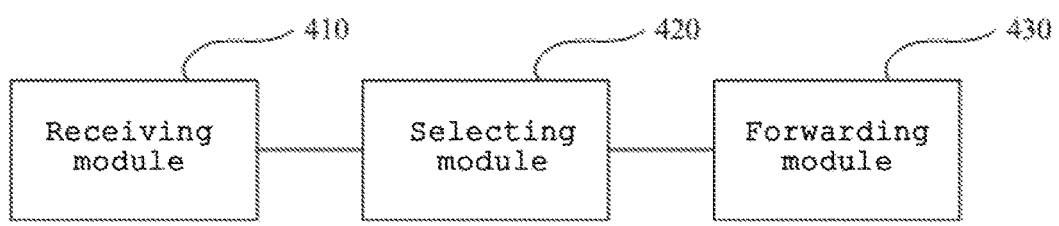
FIG. 4 is a schematic structural diagram of a data forwarding apparatus according to an embodiment of the present application.

Referring further to FIG. 4, as an implementation of the foregoing methods shown in the figures, the present application provides one embodiment 400 for a data forwarding apparatus. This apparatus embodiment corresponds to the method embodiment as shown in FIG. 2. The apparatus may be specifically applied to the gateway 110 that operates in the virtual router cluster as shown in FIG. 1.

As shown in FIG. 4, the data forwarding apparatus may include a receiving module 410, a selecting module 420, and a forwarding module 430.

The receiving module 410 may be configured to receive an externally transmitted data packet.

The selecting module 420 may be configured to select a first virtual router corresponding to the data packets based on the Open Shortest Path First protocol.

The forwarding module 430 may be configured to forward the data packet to the first virtual router corresponding to the data packet.

In some optional implementations, the forwarding module 430 may be further configured to: acquire address information of the data packet; and select the first virtual router corresponding to the data packet based on a hash value of the address information.

In some optional implementations, the address information of the data packet may include, for example, a source network protocol address, a source port number, a target network protocol address, a target port number and a protocol code of the data packet.

It should be appreciated by those skilled in the art that the above-mentioned data forwarding apparatus 400 further includes other well-known structures, for example, a processor and a memory. Such well-known structures are not shown in FIG. 4 so as to not unnecessarily obscure the embodiments of the disclosure.

Figure 5:
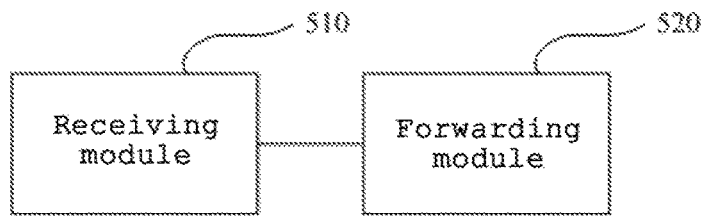
FIG. 5 is a schematic structural diagram of a data forwarding apparatus according to another embodiment of the present application.

Referring further to FIG. 5 as an implementation of the foregoing methods shown in the figures, the present application provides one embodiment 500 for a data forwarding apparatus. This apparatus embodiment corresponds to the method embodiment as shown in FIG. 3. The apparatus may be specifically applied to the first virtual router 121 that operates in the virtual router cluster as shown in FIG. 1.

As shown in FIG. 5, the data forwarding apparatus may include a receiving module 510 and a forwarding module 520.

The receiving module 510 may be configured to receive a data packet sent by a gateway based on satisfying the Open Shortest Path First protocol.

The forwarding module 520 may be configured to forward the data packet to a destination.

In some optional implementations, the receiving module 510 may be further configured to receive the data packet sent by the gateway based on that a hash value of the address information of the data packet satisfies the Open Shortest Path First protocol.

In some optional implementations, the address information of the data packet may include, for example, a source network protocol address, a source port number, a target network protocol address, a target port number and a protocol code of the data packet.

In some optional implementations, the receiving module 510 may be further configured to: poll a network interface at a predetermined time interval; and acquire the data packet and forward the data packet to the destination, if the network interface receives the data packet sent by the gateway.

It should be appreciated by those skilled in the art that the foregoing data forwarding apparatus 500 further includes other well-known structures, for example, a processor and a memory. Such well-known structures are not shown in FIG. 5 to avoid obscuring unnecessarily the embodiments of the disclosure.

Hereinafter, referring to FIG. 6, a schematic structural diagram of a computer system adapted to implement a host of a gateway or a virtual router according to an embodiment of the present application is shown.

Figure 6:
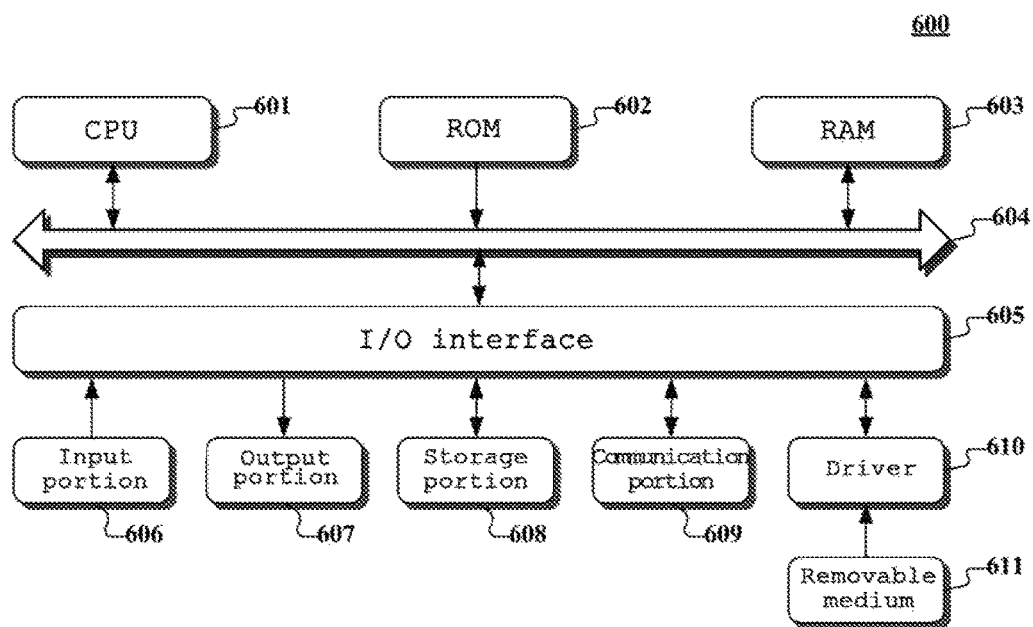
FIG. 6 is a schematic structural diagram of a computer system adapted to implement a host of a gateway or a virtual router according to an embodiment of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method as shown in the flow charts. In such an embodiment, the computer program may be downloaded and installed from a network via the communication portion 609, and/or may be installed from the removable media 611.

The flow charts and block diagrams in the figures illustrate architectures, functions and operations that may be implemented according to the system, the method and the computer program product of the various embodiments of the present disclosure. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising an receiving module, a selecting module and a forwarding module, where the names of these units are not considered as a limitation to the units. For example, the receiving module may also be described as "a unit for receiving an externally transmitted data packet".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs cause a device, when being executed by the device, to receive an externally transmitted data packet; select a first virtual router corresponding to the data packet based on an Open Shortest Path First protocol; and forward the data packet to the first virtual routers corresponding to the data packet.

In addition, the one or more programs stored in the non-volatile computer storage medium of the present application may also cause a device, when being executed by the device, to: receive a data packet sent by a gateway based on satisfying the Open Shortest Path First protocol; and forward the data packet to a destination.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the disclosure, such as, technical solutions formed by replacing the features as disclosed in the present application with (but not limited to), technical features with similar functions.

What is claimed is:

1. A virtual router cluster, comprising:
a gateway and at least one virtual router interconnected with the gateway;
the gateway receiving an externally transmitted data packet;
the gateway selecting a first virtual router corresponding to the data packet from the at least one virtual router according to an Open Shortest Path First protocol, and forwarding the data packet to the first virtual router corresponding to the data packet; and
the first virtual router receiving the data packet and forwarding the data packet to a destination, wherein when the first virtual router receives the data packet and forwards the data packet to the destination,
a plurality of first kernels polls a network interface of a first host at a predetermined time interval; and
if the network interface receives the data packet sent by the gateway when a second kernel in the plurality of first kernels accesses the network interface, the second kernel acquires the data packet and forwards the data packet to the destination,
wherein the first host is a host of the first virtual router, and the first kernel is a kernel of the first host exclusively occupied by the first virtual router.

2. The virtual router cluster according to claim 1, wherein when selecting the first virtual router corresponding to the data packet from the at least one virtual router according to the Open Shortest Path First protocol, the gateway:
acquires address information of the data packet; and
selects the first virtual router corresponding to the data packet based on a hash value of the address information.

3. The virtual router cluster according to claim 2, wherein the address information of the data packet comprises:
a source network protocol address, a source port number, a target network protocol address, a target port number and a protocol code of the data packet.

4. A data forwarding method, comprising:
receiving an externally transmitted data packet;
selecting a first virtual router corresponding to the data packet according to an Open Shortest Path First protocol; and
forwarding the data packet to the first virtual router corresponding to the data packet,
wherein when the first virtual router receives the data packet,
a plurality of first kernels polls a network interface of a first host at a predetermined time interval; and
if the network interface receives the data packet sent by the gateway when a second kernel in the plurality of first kernels accesses the network interface, the second kernel acquires the data packet,
wherein the first host is a host of the first virtual router, and the first kernel is a kernel of the first host exclusively occupied by the first virtual router.

5. The method according to claim 4, wherein the selecting the first virtual router corresponding to the data packet according to the Open Shortest Path First protocol comprises:
acquiring address information of the data packet; and
selecting the first virtual router corresponding to the data packet based on a hash value of the address information.

6. The method according to claim 5, wherein the address information of the data packet comprises:
a source network protocol address, a source port number, a target network protocol address, a target port number and a protocol code of the data packet.

7. A data forwarding method, comprising:
receiving, by a first virtual router, a data packet sent by a gateway based on satisfying an Open Shortest Path First protocol; and
forwarding the data packet to a destination-, wherein when the first virtual router receives the data packet and forwards the data packet to the destination,
a plurality of first kernels polls a network interface of a first host at a predetermined time interval; and
if the network interface receives the data packet sent by the gateway when a second kernel in the plurality of first kernels accesses the network interface, the second kernel acquires the data packet and forwards the data packet to the destination,
wherein the first host is a host of the first virtual router, and the first kernel is a kernel of the first host exclusively occupied by the first virtual router.

8. The method according to claim 7, wherein the receiving, by a first virtual router, the data packet sent by the gateway based on satisfying the Open Shortest Path First protocol comprises:
receiving the data packet sent by the gateway based on that a hash value of address information of the data packet satisfies the Open Shortest Path First protocol.

9. The method according to claim 8, wherein the address information of the data packet comprises:
a source network protocol address, a source port number, a target network protocol address, a target port number and a protocol code of the data packet.

10. A data forwarding apparatus, comprising:
at least one processor; and
a memory storing instructions, the instructions when executed by the at least one processor, cause the at least one processor to perform operations, the operations comprising:
receiving an externally transmitted data packet;
selecting a first virtual router corresponding to the data packet according to an Open Shortest Path First protocol; and
forwarding the data packet to the first virtual router corresponding to the data packet,
wherein when the first virtual router receives the data packet,
a plurality of first kernels polls a network interface of a first host at a predetermined time interval; and
if the network interface receives the data packet sent by the gateway when a second kernel in the plurality of first kernels accesses the network interface, the second kernel acquires the data packet,
wherein the first host is a host of the first virtual router, and the first kernel is a kernel of the first host exclusively occupied by the first virtual router.

11. The apparatus according to claim 10, wherein the selecting the first virtual router corresponding to the data packet according to the Open Shortest Path First protocol comprises:
acquiring address information of the data packet; and
selecting the first virtual router corresponding to the data packet based on a hash value of the address information.

12. The apparatus according to claim 11, wherein the address information of the data packet comprises:
a source network protocol address, a source port number, a target network protocol address, a target port number and a protocol code of the data packet.

13. A data forwarding apparatus, comprising:
at least one processor; and
a memory storing instructions, the instructions when executed by the at least one processor, cause the at least one processor to perform operations, the operations comprising:
receiving, by a first virtual router, a data packet sent by a gateway based on satisfying an Open Shortest Path First protocol; and
forwarding the data packet to a destination,
wherein when the first virtual router receives the data packet and forwards the data packet to the destination,
a plurality of first kernels polls a network interface of a first host at a predetermined time interval; and
if the network interface receives the data packet sent by the gateway when a second kernel in the plurality of first kernels accesses the network interface, the second kernel acquires the data packet and forwards the data packet to the destination,
wherein the first host is a host of the first virtual router, and the first kernel is a kernel of the first host exclusively occupied by the first virtual router.

14. The apparatus according to claim 13, wherein the receiving, by a first virtual router, a data packet sent by a gateway based on satisfying an Open Shortest Path First protocol comprises:
receiving the data packet sent by the gateway based on that a hash value of address information of the data packet satisfies the Open Shortest Path First protocol.

15. The apparatus according to claim 14, wherein the address information of the data packet comprises:
a source network protocol address, a source port number, a target network protocol address, a target port number and a protocol code of the data packet.

* * * * *